(12) United States Patent
Suzuki

(10) Patent No.: US 6,786,613 B2
(45) Date of Patent: Sep. 7, 2004

(54) SPREAD ILLUMINATING APPARATUS

(75) Inventor: Shingo Suzuki, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 36 days.

(21) Appl. No.: 10/242,410

(22) Filed: Sep. 13, 2002

(65) Prior Publication Data

US 2003/0058633 A1 Mar. 27, 2003

(30) Foreign Application Priority Data

Sep. 21, 2001 (JP) .................................... 2001-288981

(51) Int. Cl.[7] .............................. F21V 8/00; F21V 7/04
(52) U.S. Cl. ...................... 362/31; 362/560; 385/901
(58) Field of Search ........................ 362/31, 330, 339, 362/560, 561; 349/62, 65, 67; 385/129, 901

(56) References Cited

U.S. PATENT DOCUMENTS

| | | | | |
|---|---|---|---|---|
| 5,584,556 A | * | 12/1996 | Yokoyama et al. | 362/31 |
| 5,775,791 A | * | 7/1998 | Yoshikawa et al. | 362/31 |
| 5,838,403 A | * | 11/1998 | Jannson et al. | 349/65 |
| 5,980,054 A | * | 11/1999 | Fukui et al. | 362/31 |
| 6,074,069 A | * | 6/2000 | Chao-Ching et al. | 362/31 |
| 6,088,074 A | * | 7/2000 | Suzuki | 362/31 |
| 6,164,799 A | * | 12/2000 | Hirmer et al. | 362/330 |

* cited by examiner

Primary Examiner—Alan Cariaso
(74) Attorney, Agent, or Firm—Oliff & Berridge, PLC

(57) ABSTRACT

In a light reflection pattern formed on a bottom surface of a light conductive plate, an inclined surface of grooves positioned at a predetermined distance or farther from a lamp includes a non-flat portion whose inclination angle varies gradually. Light rays traveling in the light conductive plate are reflected at the non-flat portion with an appropriate angle suitable for increasing a viewing field angle and exit out from a top surface of the light conductive plate. Consequently, the viewing field angle at the portion positioned at a predetermined distance or farther from the lamp can be increased.

9 Claims, 8 Drawing Sheets

SPREAD ILLUMINATING APPARATUS

BACKGROUND OF THE INVENTION

1. Field of the Invention

The present invention relates to a low-profile spread illuminating apparatus used as an illuminating means for signs, various display devices and so on, and used as a back illuminating means and a front illuminating means for a liquid crystal display device.

2. Description of the Related Art

A liquid crystal display (hereinafter referred to as "LCD") operating in low power consumption and characterized by its small thickness and lightweight has been extensively used in electric products including personal computers and cellular phones, and demand for the LCD has been increasing. However, since a liquid crystal which is a structural element of the LCD does not emit light by itself unlike a light emitting element such as a cathode-ray tube (CRT), the LCD requires a separate illuminating means to observe an image when the LCD is used in a dark place. In particular, in recent years, to satisfy a demand for downsizing and energy saving, a spread illuminating apparatus of side light type (light conductive plate type) is often used as an illuminating means for the LCD.

FIG. 9 is a schematic sectional view of a spread illuminating apparatus 1 used as a back illuminating means. The spread illuminating apparatus 1 is mainly composed of a light conductive plate 2 and a lamp 11. A top surface 6 of the light conductive plate 2 is arranged so as to face a bottom surface of a transmission-type liquid crystal display element (not shown). A cold-cathode fluorescent lamp (CCFL) or a hot-cathode fluorescent lamp (HCFL) is used as the lamp 11. Also, recently, a lamp is often used which is configured such that a spot-like light source such as a light emitting diode is arranged at at least one end of a light conductive bar made of a transparent material.

A light reflection pattern 7 is formed on a bottom surface 4 of the light conductive plate 2. The light reflection pattern 7 is composed of grooves 8 each substantially rectangular in section and flat portions 9 each parent between adjacent grooves 8, and is adapted to reflect and emit light rays from the lamp 11 substantially vertically from the top surface 6 of the light conductive plate 2. In the light reflection pattern 7, depths of the grooves 8 differ depending on their position so that luminance is almost uniform at any positions of the light conductive plate 2 independent of a distance from the lamp 11. Specifically, the depth of the grooves 8 is set to increase gradually with an increase in distance from an end surface 3 facing the lamp 11 such that a groove 8 thereof closest to an end surface 5 opposite to the end surface 3 has a maximum depth. In this connections since the grooves 8 of the light reflection pattern 7 formed on the light conductive plate 2 are very fine, they cannot be recognized with the naked eye when a screen is observed. Alternatively, the distance between two adjacent grooves 8 or the width of the flat portions 9 may be set to gradually decrease as the distance from the lamp 11 increases, while the depth of the grooves 8 is set to be constant regardless of the position.

How the light rays travel at the light reflection pattern 7 will now be described with reference to FIG. 10. In order to define the cross-section of each of the grooves 8, it is assumed that a portion corresponding to the bottom surface 4 of the light conductive plate 2 is a virtual plane S, an inclination angle of an inclined surface 30 closer to the lamp 11 (the right side of FIG. 10) is α, and that an inclination angle of an inclined surface 31 closer to the end surface 5 (the left side of FIG. 10) is β.

The inclined surface 30 is set such that a light ray 32 traveling from the right side of FIG. 10 is totally reflected at the inclined surface 30 and travels substantially vertically toward the top surface 6 of the light conductive plate 2 so as to be oriented substantially vertical to the screen. It is proved experimentally that in order to make the light ray 32 travel as above described, the inclination angle α of the inclined surface 30 may be set to range approximately 40° to 55°. In this case, since the optimum inclination angle a varies depending on the size of the light conductive plate 2, it should be selected appropriately in accordance with the size of the light conductive plate 2.

The inclination angel β of the inclined surface 31 is set in consideration of a light ray 33 incident on the inclined surface 30 at an angle smaller than a critical angle. Most of the light ray 33 incident on the inclined surface 30 at an angle smaller than a critical angle are not reflected thereat but pass therethrough to exit out from the light conductive plate 2. Here, the inclination angle β is set such that the light ray 33 having exited out from the light conductive plate 2 reenters the light conductive plate 2 to be incident on an inclined surface 30 of a next groove 8. It is proved experimentally that in order to make the light ray 33 as described above, the inclination angle β is set to range approximately 60° to 90°.

Here, since the inclination angle α of the inclined surface 30 is set such that a light ray traveling like the light ray 32 is totally reflected at the inclined surface 30 to be directed toward the screen substantially vertical to the screen as described above, the light ray 33, which reenters the light conductive plate 2 through the inclined surface 31 and reaches the inclined surface 30 is totally reflected thereat to travel in a direction perpendicular to the screen.

When the inclination angles α and β are set as described above, light rays going toward the light reflection pattern 7 travels similar to the light ray 32 or 33, and finally exit out from the top surface 6 of the light conductive plate 2 substantially perpendicular to the screen. Also, since there are very few light rays exiting out from the bottom surface 4 of the light conductive plate 2, there is no need to provide a reflection plate, which is an essential component in the conventional spread illuminating apparatus and disposed on the bottom surface 4 of the light conductive plate 2.

The light rays are totally reflected mainly at the inclined surfaces 30 of the grooves 8 to exit out from the top surface 6 of the light conductive plate 2. Since areas of the inclined surfaces 30 and 31 are set to increase gradually as the distance from the lamp 11 increases, an amount of the light rays incident on the inclined surfaces 30 also increases gradually. Accordingly, the light rays can be spread in a uniform manner on the screen in spite of the intensity of the light rays attenuating with an increasing distance from the lamp 11.

A front illuminating means is structured with the light conductive plate 2 configured upside down and with a reflection type liquid crystal display element, instead of a transmission type, being placed under the light conductive plate 2. The mechanism for achieving a uniform spread light emission on the screen is same as that of the back illuminating means described with reference to FIG. 10.

In the spread illuminating apparatus of side light type mentioned above, the luminance of the screen varies largely depending on the viewing angle to the screen at an increased distance from the lamp 11, thereby narrowing its viewing field angle.

SUMMARY OF THE INVENTION

It is an object of the present invention to provide a spread illuminating apparatus of side light type, in which the direction of light rays exiting out from the light conductive plate 2 is controlled so as to obtain a minimum viewing field angle for n increased viewing field angle irrespective of the distance from the lamp 11 thereby further improving the image quality of an LCD illuminated by the spread illuminating apparatus.

In order to achieve the above object, a spread illuminating apparatus of side light type according to the present invention may comprise: a light conductive plate made of a light-transmissible material; a bar-like lamp disposed close to and along at least one end surface of the light conductive plate; and a light reflection pattern including a large number of grooves each having an inclined surface and formed on one major surface of the light conductive plate, the inclined surface of some of the large number of grooves including a non-flat portion whose inclination angle varies gradually. According to the present invention, light traveling in the light conductive plate is reflected at the non-flat portion with an appropriate angle suitable for increasing the viewing field angle and exits out from the other major surface of the light conductive plate. Accordingly, the viewing field angle can be increased at the non-flat portion.

Further, in the spread illuminating apparatus according to the invention, preferably, the light reflection pattern may comprise a large number of grooves each shaped substantially triangular in section and a large number of flat portions each present between two adjacent grooves, and may be oriented along the length of the lamp, the depth of the grooves may increase with an increase in the distance from the lamp, and the inclined surface of grooves having a predetermined depth and larger may include the non-flat portion. Since the depth of the grooves increases with the increase in the distance from the lamp, the non-flat portion is provided on the grooves positioned at a predetermined distance and farther from the lamp. Accordingly, the viewing field angle can be increased at the area positioned at a predetermined distance and farther from the lamp.

Further, in the spread illuminating apparatus according to the invention, preferably, the light reflection pattern may comprise a large number of grooves each shaped substantially triangular in section and forming a stair-like configuration as a whole, and the inclined surface of grooves may include the non-flat portion. Accordingly, the viewing field angle can be increased at the area positioned at a predetermined distance and farther from the lamp.

Further, in the spread illuminating apparatus according to the invention, preferably, the non-flat portion may be either convexly or concavely curved. This allows am appropriate selection between the two curve configurations depending on various conditions such as the viewing field angle required, whole configuration of the light conductive plate, and the like.

Further, in the spread illuminating apparatus according to the invention, preferably, the non-flat portion may be arc-shaped in section. With such a configuration, the shape of a cutting tool for forming the grooves can be simplified.

Further, in the spread illuminating apparatus according to the invention, preferably, the non-flat portion may be polygon-shaped in section. With such a configuration, the shape of the cutting tool for forming the grooves can be simplified.

And, in the spread illuminating apparatus according to the invention, preferably, the inclined surface may be constituted either partly or entirely by the non-flat portion. This allows an appropriate selection in consideration of various conditions.

DESCRIPTION OF THE PREFERRED EMBODIMENTS

Figure 1:
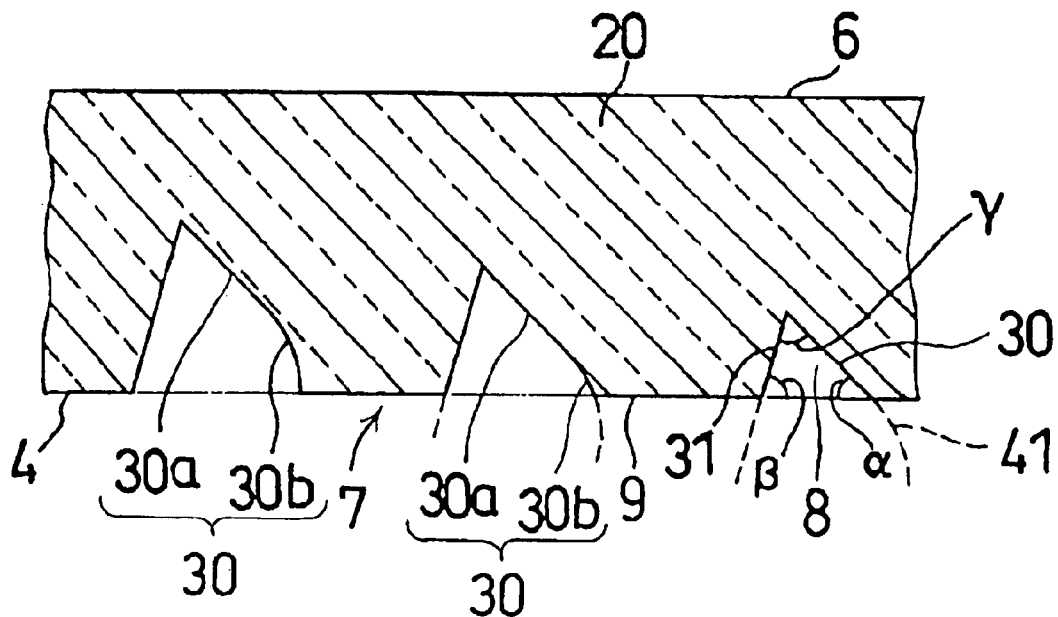
FIG. 1 is a schematic sectional view of a spread illuminating apparatus according to a first embodiment of the present invention, showing a feature of a light conductive plate thereof.

Embodiments of the present invention will be described with reference to the drawings. The same elements as those of the conventional art are denoted by the same reference numerals and a detailed description thereof will be omitted, Referring to FIG. 1, a light conductive plate 20 has on its bottom surface 4 a light reflection pattern 7 which comprises a large number of grooves 8 each shaped substantially triangular in section and oriented along the length of a lamp (not shown) and a large number of flat portions 9 each present between two adjacent grooves such that the grooves 8 have their depths increasing with an increase of a distance from the lamp (from the right to the left side of FIG. 1) and that grooves 8 having a predetermined depth and larger each have an inclined surface 30 comprising a flat portion 30*a* which has a predetermined dimension, and a non-flat portion 30*b* whose inclination angle varies gradually and continuously. Here, the predetermined depth is defined as the minimum depth of the grooves positioned within an area requiring an increased viewing field angle and is determined with reference to the results of measurement of the viewing field angle to be described later. Of course, all the grooves formed on the light conductive plate 20 can be defined as grooves with a predetermined depth depending on the product specifications. Also, the above description "the grooves 8 oriented along the length of the lamp" does not necessarily mean that the lamp and the grooves 8 are parallel with each other, but means that they may alternatively be arranged at a predetermined angle with respect to each other in order to reduce moiré fringes. In the embodiment of FIG. 1, the non-flat portion 30b is concavely curved forming an arc in section. Also, the non-flat portion 30b is present immediately from the flat portion 30a.

Figure 9:
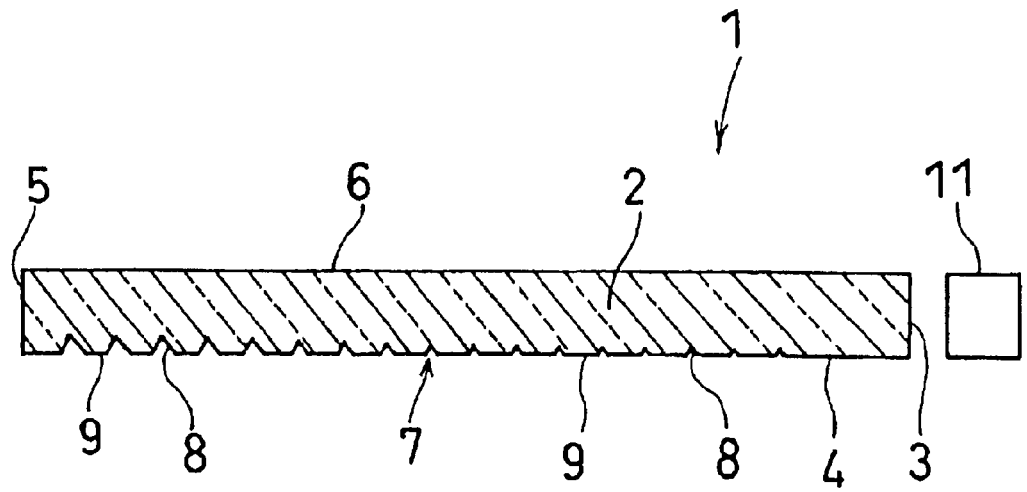
FIG. 9 is a schematic sectional view of the conventional spread illuminating apparatus, showing a structure of a light conductive plate thereof.

In FIG. 1, three grooves 8 are shown to be arranged adjacent to one another on the light conductive plate 20, but actual not. Specifically, one groove 8 on the right of the figure is formed close to the lamp 11 (refer to FIG. 9), one groove 8 at the center is formed relatively close to an end surface 5 (refer to FIG. 9) of the light conductive plate, one groove 8 on the left of the figure is formed closest to the end surface 5, and other grooves actually present therebetween are omitted. In other words, the non-flat portion 30b is not provided at the grooves 8 formed close to the lamp, and is provided at the grooves 8 having a predetermined depth and larger with the ratio of the non-flat portion 30b to the inclined surface 30 increasing with an increase in the distance from the lamp.

Referring to FIG. 1, a dotted line 41, together with the inclined surfaces 30 (strictly, the flat portion 30a) and 31, defines the configuration of a tool for cutting the grooves 8, and the grooves 8 formed by the cutting tool are configured such that an inclination angle α of the inclined surface 30 closer to the lamp 11 (on the right side of FIG. 1) is 45°, an inclination angle β of the inclined surface 31 closer to the end surface 5 (on the left side of FIG. 1) is 75°, and an apex angle γ is 60°. This configuration is one example suitable for increasing the viewing field angle effectively.

The light conductive plate 20 according to the first embodiment of the invention gives the following advantages.

Figure 10:
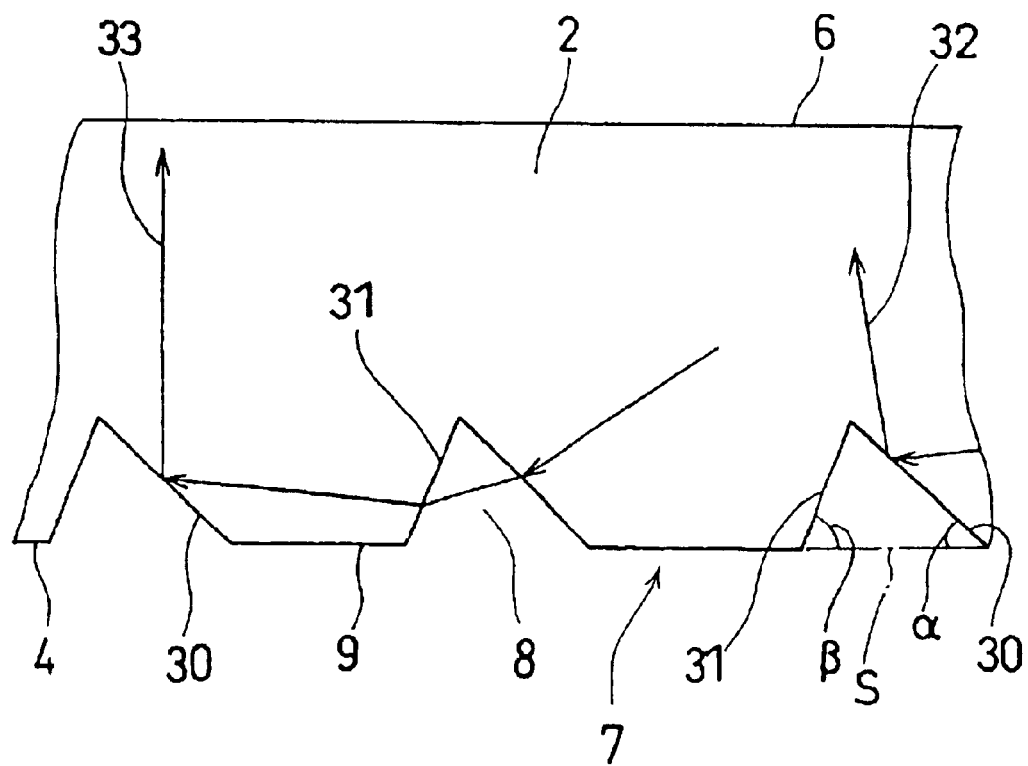
FIG. 10 is a schematic view showing how light rays travel to a light reflection pattern of the light conductive plate of the conventional spread illuminating apparatus shown in FIG. 9.

The non-flat portion 30b is provided only at the grooves 8 positioned a predetermined distance or more away from the lamp. Light rays (refer to reference numerals 31 and 32 in FIG. 10) traveling in the light conductive plate 20 are reflected at the non-flat portion 30b with appropriate angles suitable for increasing the viewing field angle and exit out from a top surface 6 of the light conductive plate 20. Accordingly, the viewing field angle can be increased at any portions positioned away from the lamp by the predetermined distance or more.

As described above, it is pointed out that in the spread illuminating apparatus of side light type, the luminance of the screen greatly changes depending on the viewing angle to observe the screen at portions positioned away from the lamp 11, thereby narrowing the viewing field angle. Therefore, the non-flat portion 30b is provided at the grooves 8 formed at the portions where the viewing angle is substantially narrowed in order to control the direction of the light rays exiting out from the light conductive plate 20, thereby increasing the viewing field angle. Consequently, the quality of the image on the LCD illuminated by the spread illuminating apparatus can be further improved.

The non-flat portion 30b is arc-shaped in section, simplifying the shape of the cutting tool for forming the grooves 8. Moreover, since the cutting tool with its apex angle fixed has a straight portion of a predetermined dimension corresponding to the flat portion 30a of the inclined surface 30, the non-flat portion 30b is not formed at the grooves 8 positioned in the vicinity of the lamp (on the right of FIG. 1) and having a small depth, while the non-flat portion 30b is formed at the grooves 8 with a predetermined depth and larger (at the center and on the left of FIG. 1).

The non-flat portion 30b is formed so as to be continuous with the flat portion 30a, whereby the inclined surface 30 has an effect of reflecting light rays at the non-flat portion 30b while maintaining an effect of reflecting light rays at the flat portion 30b obtained in the conventional art. Consequently, the most advantageous effect can be realized that the viewing field angle is increased wherever so required while minimizing a decrease in the whole luminance.

Figure 2:
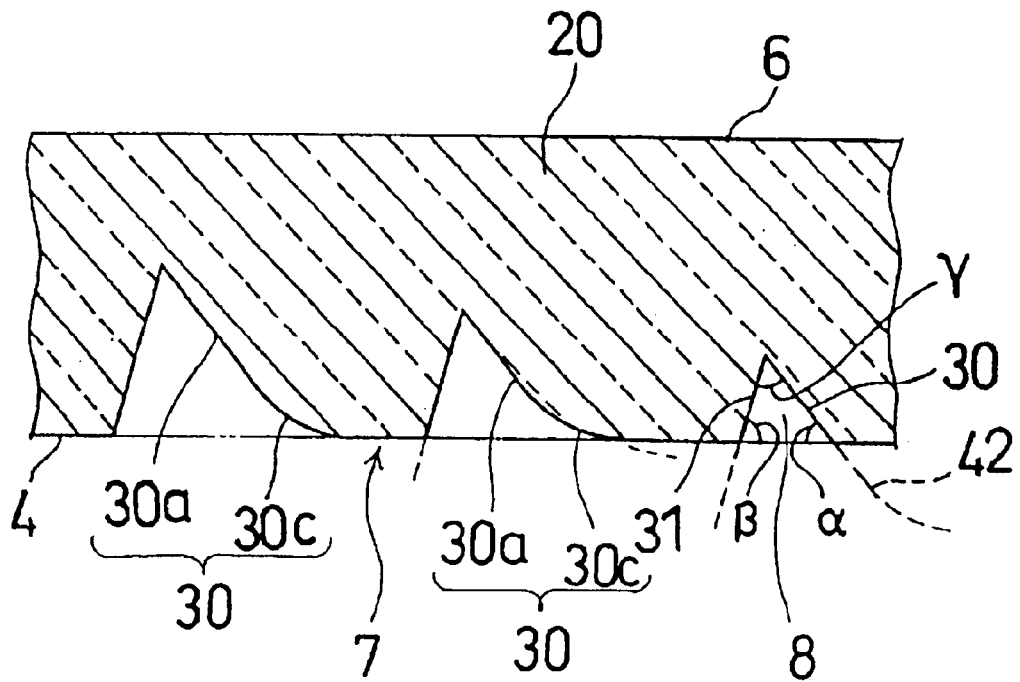
FIG. 2 is a schematic sectional view of a spread illuminating apparatus according to a second embodiment of the present invention, showing a feature of a light conductive plate thereof.

A second embodiment of the invention will be explained with reference to FIG. 2. Elements identical with or corresponding to those of the conventional art and the first embodiment of the invention will be denoted by the same reference numerals and a detailed description thereof will be omitted.

The second embodiment of the invention is different from the first embodiment in that a non-flat portion 30c whose inclination angle varies gradually and continuously is convexly curved, rather than concavely. Accordingly, a cutting tool whose configuration is defined by a dotted line 42 and inclined surfaces 30 (strictly, a straight portion 30a) and 31 so as to form grooves 8 with the inclined surface 30 including the non-flat portion 30c is different from the cutting tool defined by the dotted line 41.

The selection between the non-flat portions 31b and 31 is made as appropriate based on various conditions including the viewing field angle and the whole configuration of the light conductive plate 20, and this second embodiment gives effects similar to those of the first embodiment of the invention.

Figure 3:
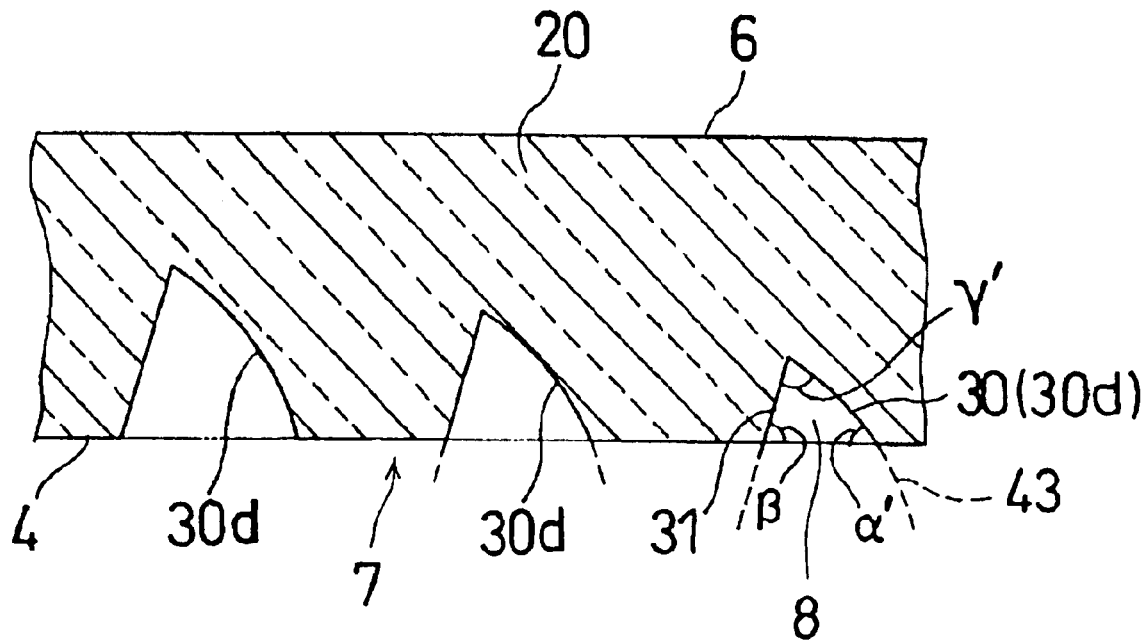
FIG. 3 is a schematic sectional view of a spread illuminating apparatus according to a third embodiment of the present invention, showing a feature of a light conductive plate thereof.

A third embodiment of the invention will be explained with reference to FIG. 3. Elements identical with or corresponding to those of the conventional art and the first and second embodiments of the invention will be denoted by the same reference numerals and a detailed description thereof will be omitted.

Third embodiment of the invention is different from the first and second embodiments of the invention in that a inclined surface 30 comprises only a non-flat portion 30d whose inclination angle varies gradually and continuously. Accordingly, a cutting tool is shaped to follow the configuration defined by the inclined by the inclined surfaces 30 and 31 and a dotted line 43.

This contributes to further simplification of the configuration of a cutting tool. Although an inclination angle α' of the inclined surface 30 and an apex angle γ' are different from the angles α and γ in the fist and second embodiments of the invention, the difference is slight practically. Also, an inclination angle α made in the vicinity of the apex of the groove 8 is not so greatly different from the one made in the first and second embodiments, so the third embodiment gives effects similar to those of the first and second embodiments of the invention.

A fourth embodiment of the invention will be explained with reference to FIG. 4. Elements identical with or corresponding to those of the conventional art and the first to third embodiments of the invention will be denoted by the same reference numerals and a detailed description thereof will be omitted.

The fourth embodiment of the invention is different from the first to third embodiments of the invention in that light reflection pattern 34 is provided which comprises a large number of grooves without flat portions forming a stair-like section and is oriented along the length of the lamp, and in which a non-flat portion 34a is provided at the grooves.

Figure 4:
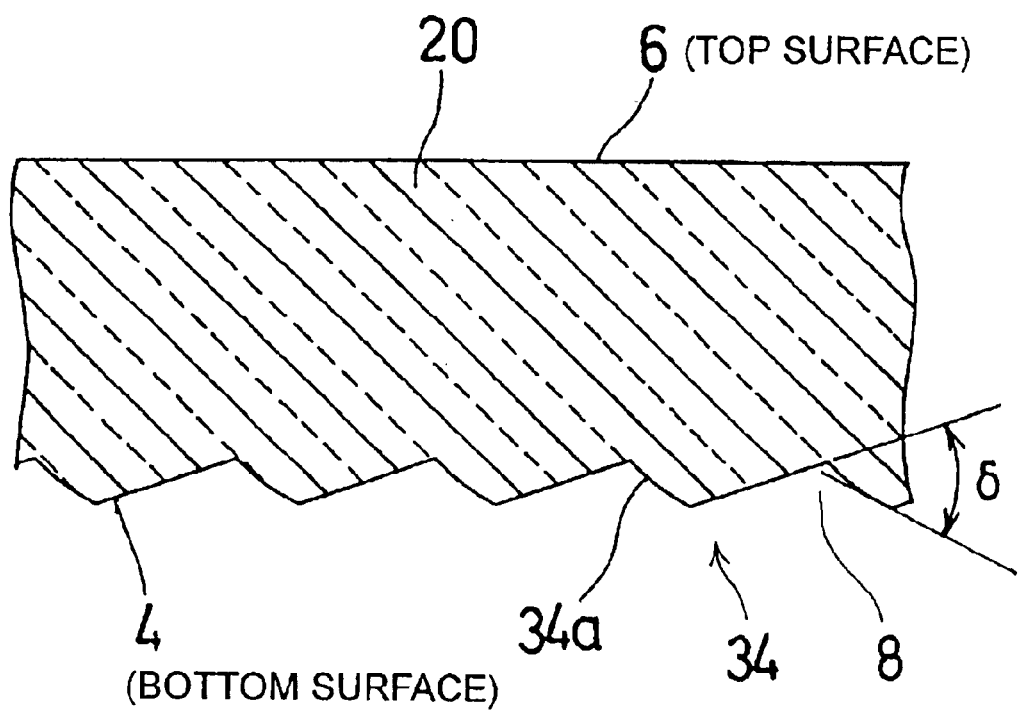
FIG. 4 is a schematic sectional view of a spread illuminating apparatus according to a fourth embodiment of the present invention, showing a feature of a light conductive plate thereof.

In the embodiment of FIG. 4, the non-flat portion 34a is convexly curved, forming an arc in section. Also in the figure, the non-flat portion 34a is formed such that an angle 6 made between a virtual datum plane for the non-flat portion 34a and a straight inclined surface of the grooves is equal to 45 degrees. This value is one example suitable for increasing the viewing field angle effectively.

In the fourth embodiment of the invention, the non-flat portion 34a is formed on the inclined surface of the grooves positioned at a predetermined distance or more away from lamp, and the light rays (refer to reference numerals 32 and 33 in FIG. 10) traveling in the light conductive plate 20 are reflected at the non-flat portion 34a to exit out from the top surface 6 of the light conductive plate 20. Consequently, the fourth embodiment gives effects similar to those of the first to third embodiments of the invention.

Figure 5:
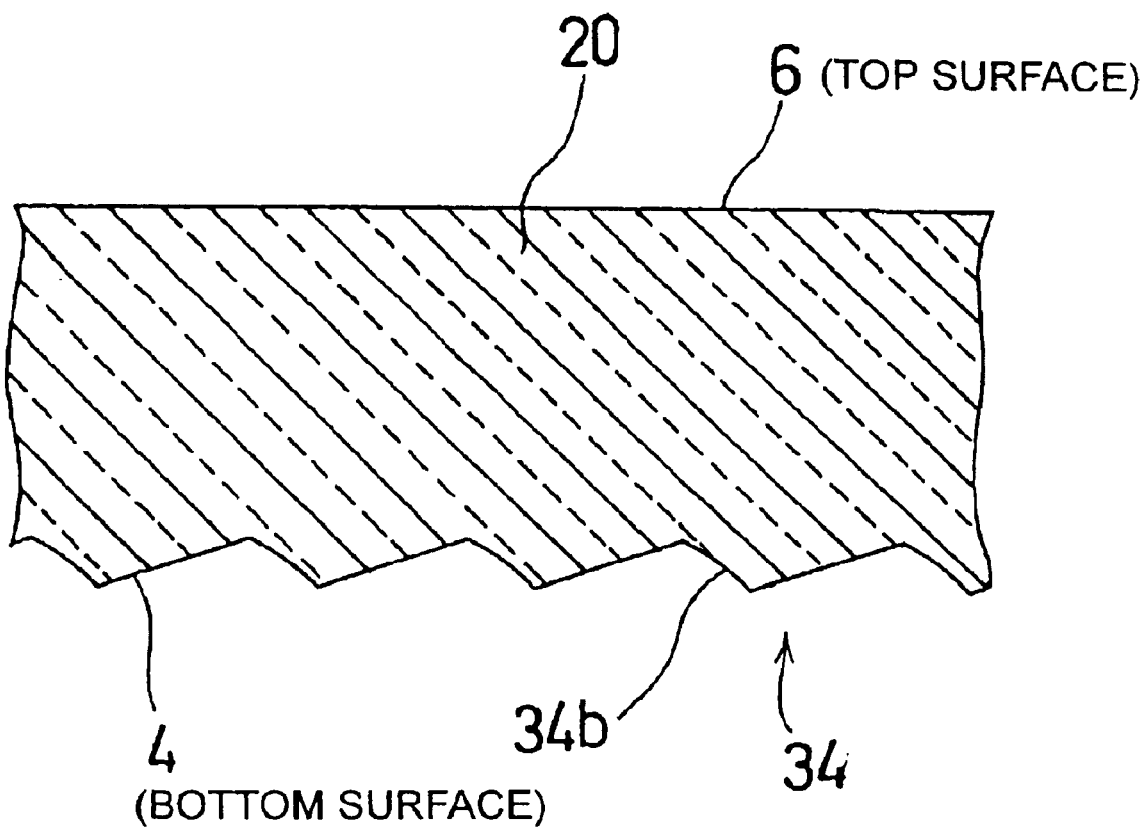
FIG. 5 is a schematic sectional view of a spread illuminating apparatus according to a fifth embodiment of the present invention, showing a feature of a light conductive plate thereof.

A fifth embodiment of the invention will be explained with reference to FIG 5. Elements identical with or corresponding to those of the fourth embodiment of the invention will be denoted by the same reference numerals and a detailed description thereof will be omitted.

The fifth embodiment of the invention is different from the fourth embodiment of the invention in that a non-flat portion 34b of the step-like light reflection pattern 34 is concavely curved. The selection between the non-flat portions 34a and 34b is made as appropriate based on various conditions including the viewing field angle and the whole configuration of the light conductive plate 20. The fifth embodiment gives effects similar to the fourth embodiment of the invention.

Figure 11:
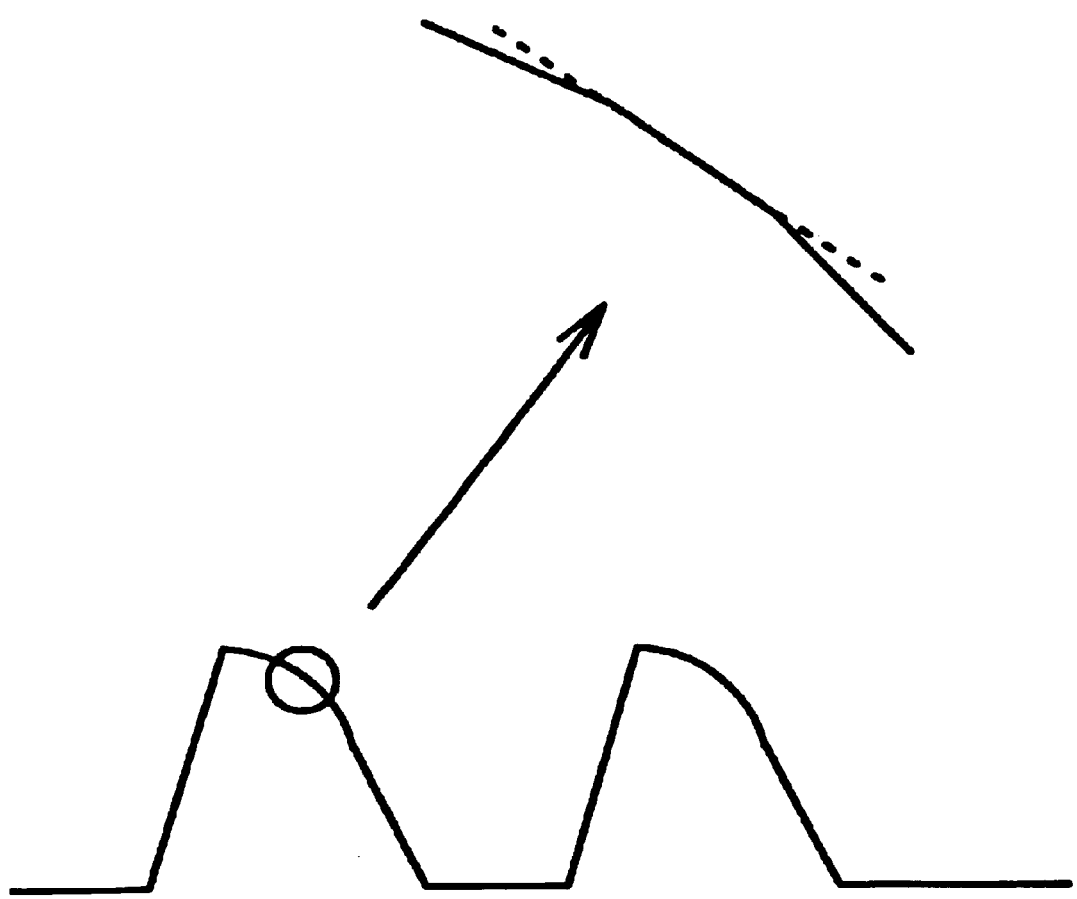
FIG. 11 illustrates a sectional configuration of grooves of a light conductive plate.

Furthermore, as illustrated in FIG. 11, in the first to fifth embodiments of the invention, the non-flat portion may include a plurality of line segments forming a part of a polygonal configuration in section in place of the arc configuration. Also, the similar effects can be obtained with a different curvature. The selection between the different configurations is made as appropriate based on various conditions including the viewing field angle and the whole configuration of the light conductive plate 20. The embodiments of the invention are explained for a back illuminating means of the LCD, but the invention can be applied also to a front illuminating means. And although the lamps mentioned as conventional art in this description may be applied to the invention, the invention is not limited thereto but applicable to and any other lamps that have a similar configuration.

The light reflection pattern to which the invention is applicable does not have to be structured as described above, but may be otherwise structured as long as it comprises grooves having inclined surfaces. For example, when the light reflection pattern is structured such that the depth of grooves are constant and the widths of flat portions are varied thereby realizing a uniform spread luminance on the whole screen, the light conductive plate 20 may be virtually divided into a plurality of areas in accordance with the viewing field angles required, and a plurality of cutting tools with different outside configurations may be used in order to form optimum groove configurations for respective areas. Also, the shape of the groove is not limited to a triangle, but may be, for example, a trapezoid. And, the light reflection pattern most suitable for the required viewing field angle may be configured by combining the light reflection patterns of various configurations

EXAMPLES

A spread illuminating apparatus according to the present invention (corresponding to the first embodiment of the invention) was produced as an example and its luminance was measured. The configuration of the spread illuminating apparatus will be described with reference to FIGS. 6A and 6B respectively showing side and top views of the spread illuminating apparatus 1.

The light conductive plate 20 of a flat plate (size: 79.35 mm×58.8 mm, thickness: 1 mm) made of a transparent acrylic resin and having its entire peripheral surfaces smoothly polished had on its bottom surface 4 the light reflection pattern 7 including the grooves 8 in parallel with a shorter side of the light conductive plate 20 (in parallel with the lamp 11). The grooves 8 of the light reflection pattern 7 were formed at a constant pitch of 0.2 mm.

Figure 6A:
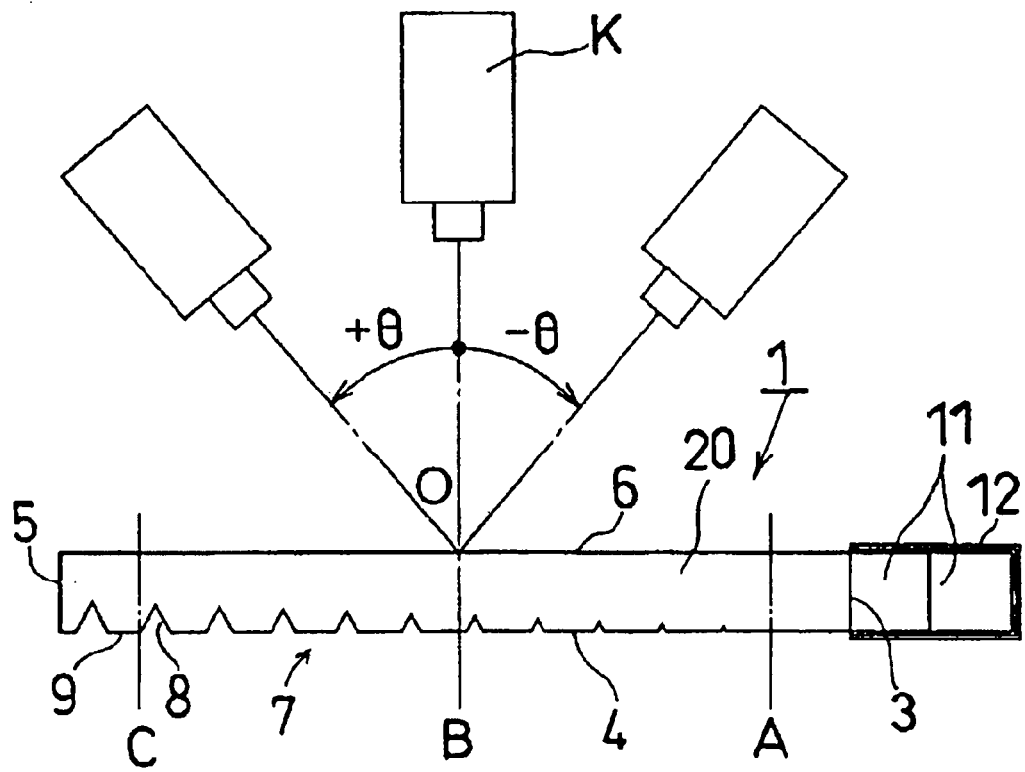
FIGS. 6A and 6B are schematic views explaining a luminance measuring method.

The grooves 8 of the light reflection pattern 7 were configured such that the inclination angle α of the inclined surface 30 of the groove 8 triangular in section was 45°, the inclination angle β of the inclined surface 31 was 75°, and the apex angle γ was 60° embodied as in FIG. 1, though not shown in FIG. 6A. The depth was arranged to gradually increase from 3 μm to 15 μm. The non-flat portion 30b was formed entirely on the inclined surface and had a constant radius R of 0.2 mm.

The lamp 11 comprised two light conductive bars made of a transparent material and four LEDs (light-emitting diodes manufactured by Nichia Corporation; trade name: NSCW215-bR) each disposed at each of both ends, of each of the two light conductive bars. The lighting condition for the LEDs was 18 mA per LED. Furthermore, a PET (polyethylene telephthalate) film having silver evaporated thereon was used on a reflector 12 for covering the longitudinal surfaces of the lamp 11.

Figure 6B:
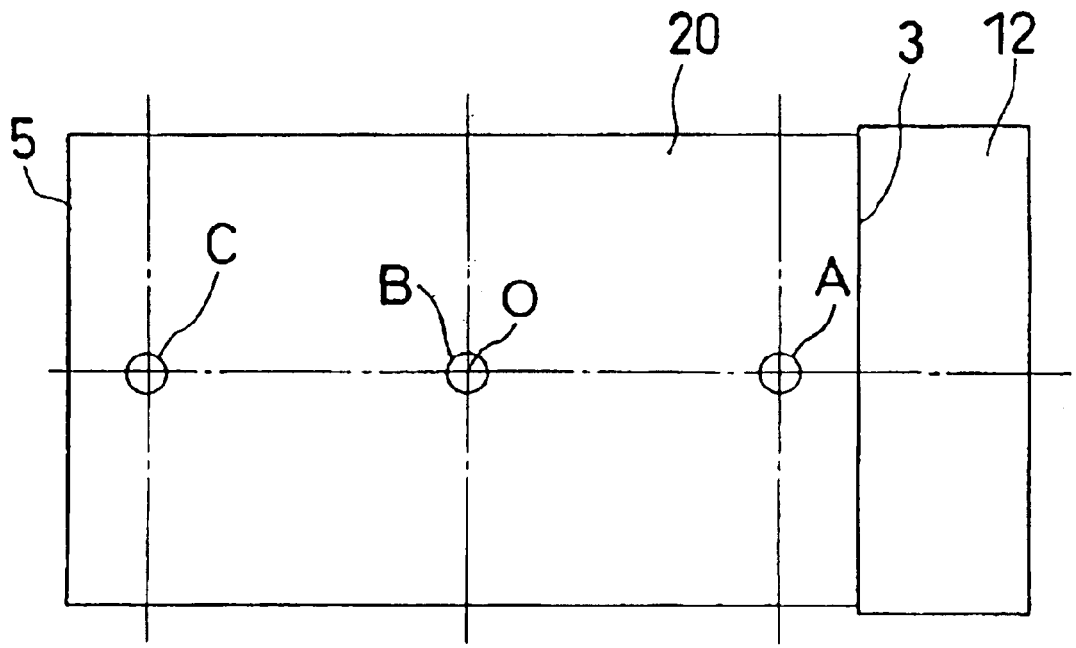

The luminance on the screen of the spread illuminating apparatus 1 was measured according to the method described below and the distribution of the emission angle of the light rays radiated onto the screen was observed. It was assumed that the center of the screen of the spread illuminating apparatus 1 was a reference point O and a position at which a luminance meter K was placed at a predetermined distance (50 cm) apart from the reference point O in a direction perpendicular (front) to the screen was 0° as shown in FIG. 6B. Then, the luminance meter K was moved from the reference point O toward the end surfaces 3 and 5, respectively, by up to 40° as shown in FIG. 6A, thus measuring the luminance for each predetermined angle.

The measurement distance (distance from the reference point O to the end of the luminance meter K) was kept constant (50 cm) irrespective of the position of the luminance meter K). Here, the movement of the luminance meter K toward the end surface 5 was expressed by plus and the movement toward the end surface 3 was expressed by minus. A luminance meter manufactured by TOPKON Co. (BM-7, a viewing angle of 1°) was used as the luminance meter K.

Assuming that an observation position at the reference point O was a measurement point B and, referring to FIGS. 6A and 6B, similarly, an observation portion close to the lamp 11 on the center line along the longer side of the light conductive plate 20 was a measurement point A and an observation position symmetrically opposite to the measurement point A was a measurement point C, the luminance was measured in the same manner as the above.

Figure 7A:
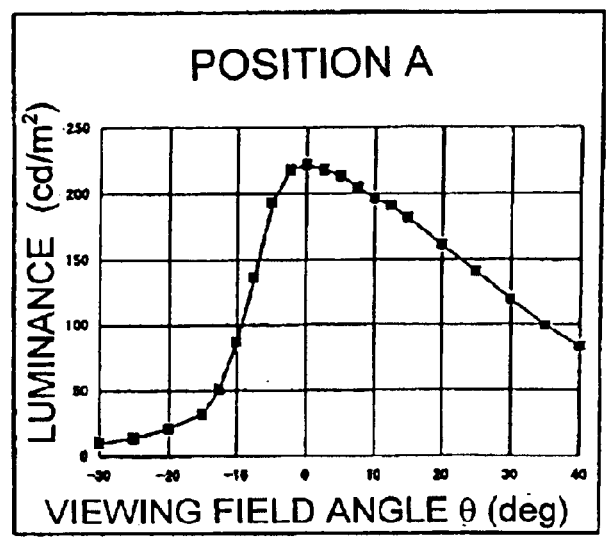
FIGS. 7A to 7C are graphs of results of measuring the luminance of the spread illuminating apparatus according to the first embodiment of the present invention.
Figure 7B:
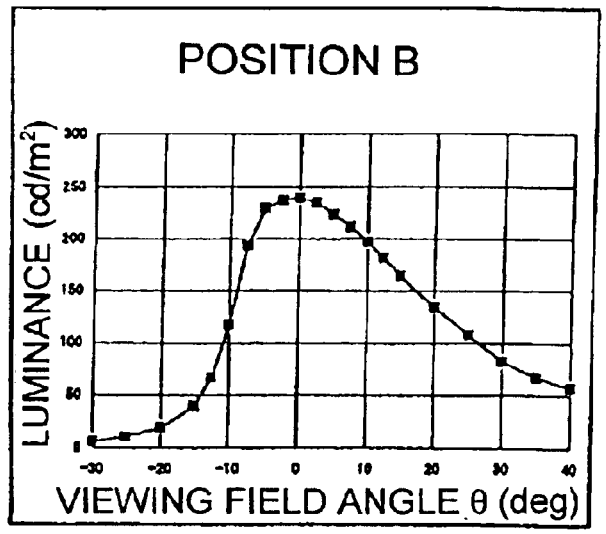
Figure 7C:
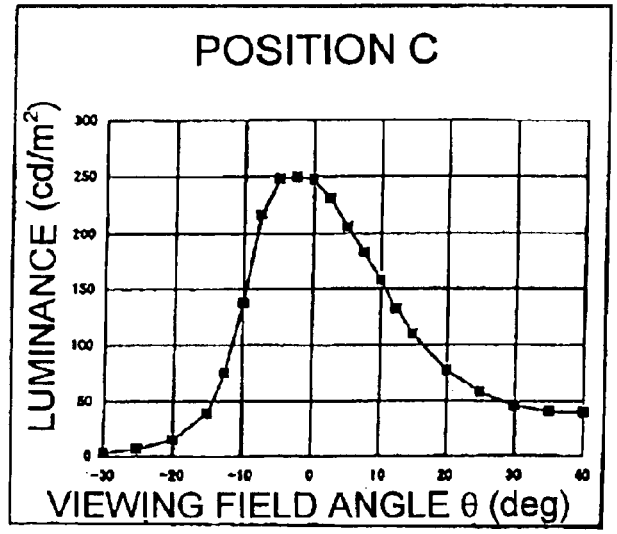
Figure 8A:
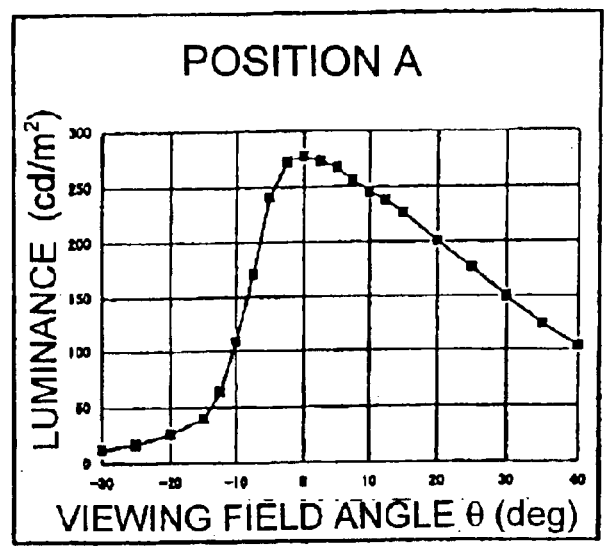
FIGS. 8A to 8C are graphs of results of measuring the luminance of a conventional spread illuminating apparatus.
Figure 8B:
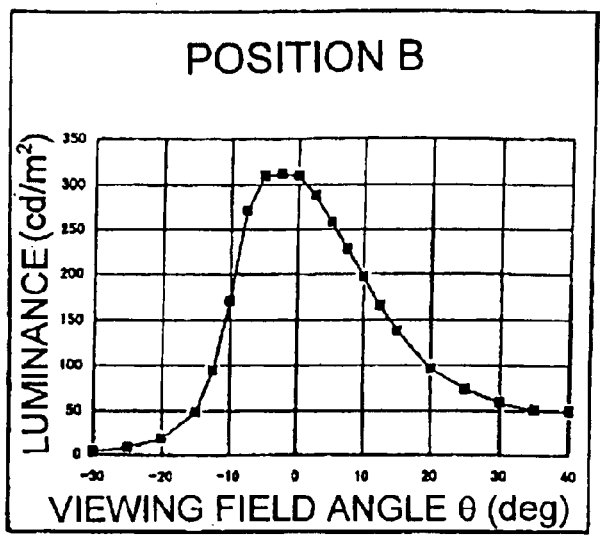
Figure 8C:
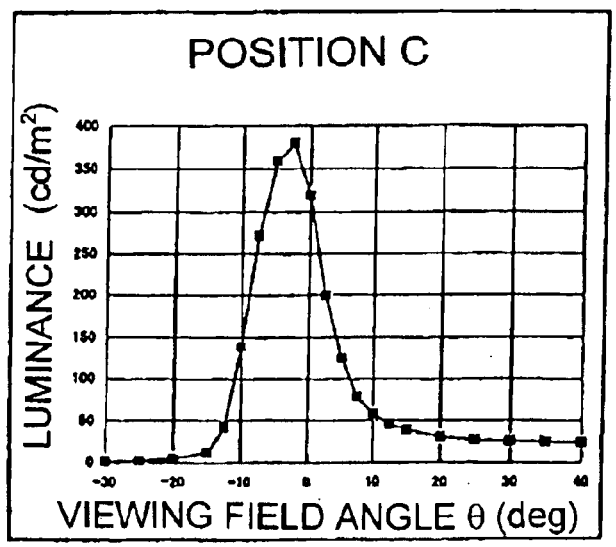

The results of measuring the luminance of the spread illuminating apparatus are shown in FIGS. 7A to 7C. The luminance by the conventional light conductive plate 2 (refer to FIGS. 9 and 10) not having the non-flat portion 30b was measured under the same condition for the purpose of comparison, and the results thereof are shown in FIGS. 8A to 8C. As is evident from the measurement results, the viewing field angle increased remarkably at the position C, and satisfactorily at the position B.

The above effects can be obtained when the pitches of the grooves 8 on the light conductive plate 20 are set to range 0.1 to 0.3 mm, the depths of the grooves 8 are set to range 1 to 30 μm, and the radius R of the non-flat portion 30b is set to range 0.05 to 0.5 mm. Also, the similar advantageous effects can be obtained in the spread illuminating apparatus according to the second to fifth embodiments of the invention.

Since the present invention is configured as described above, in the spread illuminating apparatus of side light type, the direction of light rays exiting out from the light conductive plate can be controlled to increase the viewing field angle irrespective of the distance from the lamp, thereby Improving the quality of the image on the LCD irradiated by the spread illuminating apparatus.

What is claimed is:

1. A spread illuminating apparatus of side light type, comprising:

a light conductive plate made of a light-transmissible material;

a bar-like lamp disposed close to and along at least one end surface of the light conductive plate; and a light reflection pattern including a large number of grooves each having an inclined surface in section and formed on one major surface of the light conductive plate, wherein the grooves are formed in such a manner that a depth of each of the grooves increases gradually with an increase in a distance from the lamp, the grooves having the depth equal to a predetermined depth or larger than the predetermined depth have an inclined surface including a non-flat portion having an inclination angle that varies gradually, and an area of the non-flat portion increases gradually with the increase in the distance from the lamp.

2. A spread illuminating apparatus according to claim 1, wherein the light reflection pattern includes the large number of grooves each shaped substantially triangular in section and a large number of flat portions each present between two adjacent grooves.

3. A spread illuminating apparatus according to claim 1, wherein the light reflection pattern includes the large number of grooves each shaped substantially triangular in section and forming a stair-like configuration as a whole.

4. A spread illuminating apparatus according to claim 1, wherein the non-flat portion is convexly curved.

5. A spread illuminating apparatus according to claim 1, wherein the non-flat portion is concavely curved.

6. A spread illuminating apparatus according to claim 1, wherein the non-flat portion is arc-shaped in section.

7. A spread illuminating apparatus according to claim 1, wherein the non-flat portion is in a shape of a part of a polygon in section.

8. A spread illuminating apparatus according to claim 1, wherein the inclined surface is constituted partly by the non-flat portion.

9. A spread illuminating apparatus according to claim 1, wherein the inclined surface is constituted totally by the non-flat portion.

* * * * *